No. 657,405. Patented Sept. 4, 1900.
H. R. FENLEY.
ADJUSTABLE NAILLESS HORSESHOE.
(Application filed Jan. 29, 1900.)
(No Model.)
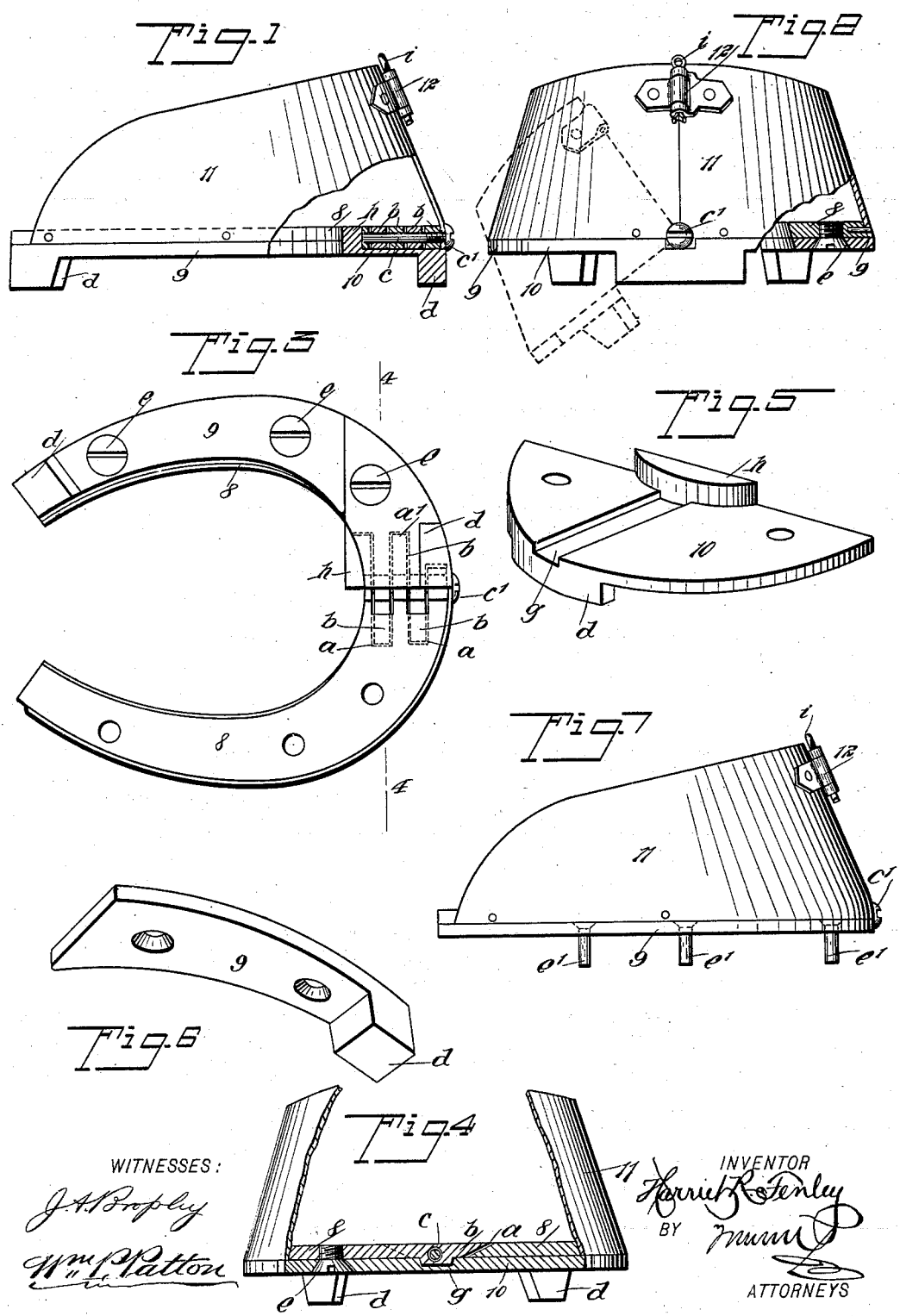
WITNESSES:
INVENTOR
Harriet R. Fenley
BY
ATTORNEYS
THE NORRIS PETERS CO., PHOTO-LITHO., WASHINGTON, D. C.

UNITED STATES PATENT OFFICE.

HARRIET R. FENLEY, OF DALLAS, TEXAS.

ADJUSTABLE NAILLESS HORSESHOE.

SPECIFICATION forming part of Letters Patent No. 657,405, dated September 4, 1900.

Application filed January 29, 1900. Serial No. 3,182. (No model.)

*To all whom it may concern:*

Be it known that I, HARRIET R. FENLEY, a citizen of the United States, and a resident of Dallas, in the county of Dallas and State of Texas, have invented a new and Improved Adjustable Horseshoe, of which the following is a full, clear, and exact description.

The object of this invention is to provide a horseshoe which may be readily placed upon or removed from the hoof of the animal's foot, which will be durable, be adapted for convenient renewal of worn tread portions, and which may be produced at a moderate cost.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side view of the improvement. Fig. 2 is a partly-sectional front view of the same. Fig. 3 is an inverted plan view of the shoe with one-half of the wear-plate removed. Fig. 4 is a front elevation of the shoe with parts removed, substantially on the line 4 4 in Fig. 3. Fig. 5 is a perspective view of the toe portion of the wear-plate. Fig. 6 is a perspective view of a side portion of the wear-plate. Fig. 7 is a side elevation of the improved shoe having the wear-plate thereof removed.

The improvement is of a class in which the hoof of the animal is partly enveloped by the shoe, and the latter is held upon the hoof by clasping it thereon, thereby avoiding the use of nails or in any manner penetrating the hoof with securing devices.

In the drawings which illustrate an embodiment of my invention, 8 indicates the tread-plate of the shoe or the portion having direct contact with the lower surface of the animal's hoof. The tread-plate 8 consists of two flat portions of a suitable thickness, each constituting one-half of said plate, and when joined together they form a horseshoe of the usual form. The forward or toe portion of the tread-plate 8 is adapted for flexure where the front ends of each half-section meet by hinging said sections together.

The hinge-joint provided is preferably formed as shown in Figs. 1, 3, and 4 and consists in producing two parallel spaced slots $a$ in one half-section at the front end thereof and a central slot $a'$ in the mating end of the other half-section. Tongues $b$ are produced on the respective ends of the tread-plate sections and fit in the slots $a$ $a'$, the tongues being jointed together by the insertion of a pintle-bolt $c$, which passes loosely into alined perforations in all the tongues $b$, with the exception of the outermost one, the perforation in which latter is screw-threaded, and the pintle-bolt is threaded near its head to screw into said threaded hole, whereby the sections of the tread-plate are loosely connected together at their curved front ends, as shown in Fig. 1. Preferably the tongues $b$ are thickened where the perforations are formed in them for the reception of the pintle-bolt $c$, so as to strengthen them at this point, and from said perforations to the points of the tongues each tongue is tapered by sloping the lower side thereof, the bottoms of the slots $a$ $a'$, near their heels, being beveled to correspond with the slope of the tongues, so that the jointed tongues are held from flexure above a level plane at their upper faces, and this also renders the upper surface of the tread-plate level when the tongues $b$ are fully bedded in the slots $a$ $a'$.

A sectional wear-plate is provided for attachment upon the lower surface of the tread-plate 8 and comprises two side plates 9 9 and a toe-plate 10. The side plates are preferably each furnished with a heel-calk $d$ and may be secured in place upon the tread-plate 8 by screws $e$ or rivets $e'$, the latter being shown in Fig. 7 as projecting from the tread-plate. The side plates 9 extend from the heel of the tread-plate to a suitable point at the front quarter of the same, and the front ends of said side plates are alined, so that the straight rear edge of the toe-plate 10 will fit closely against said ends, as shown as to one of the side plates in Fig. 3. The toe-plate 10 is a mainly flat planchet formed of steel, as are the side plates 9 9, to insure durability, and from the straight rear edge of the toe-plate its periphery is rendered convex, having a like curvature to that of the tread-plate at its front edge. The flat top surface of the toe-plate 10 has a groove $g$ formed therein extending from the center of the plate at the front edge to an abutment-flange $h$, which projects upwardly near the rear edge of the toe-plate. The abutment-flange is convex at the front and straight at the rear, said flange equaling in height the thickness of the tread-plate except where the groove $g$ is formed in the toe-plate and wherein the thickened portion of the tread-plate is seated when the toe-plate is in place. It will be seen that the flange $h$ will impinge upon the concave inner edge of the tread-plate at the joint of its two half portions when the rear straight edge of the toe-plate at each side of the central flange $h$ bears against the front ends of the side plates 9 9, and this engagement of parts will prevent forward or rearward movement of the toe-plate when the latter is clamped upon the tread-plate by the screws $e$ or the rivets $e'$.

At the apex of the toe-plate 10 a toe-calk $d$ is formed on its under side, and the three calks $d$, two of which are on the side plates 9, serve to prevent any slipping of the animal on stone pavement or on ice in winter.

A two-part clamping-hood 11 is shaped to conform to the exterior of the hoof whereon the shoe is to be placed and is afforded a sufficient height to adapt it for effective service, said hood being formed of thin plate metal. The hood 11 is bisected at the front on a central upright line, as shown in Fig. 2, and each half-section thereof laps upon the outer edge of a respective half-section of the tread-plate 8, whereon the hood-sections are secured by rivets or other available means. Near the upper edge of the clamping-hood 11 and at the front meeting edges of its two half-sections the two halves of a locking-clasp 12 in hinge form are thereon secured, one-half on each section. The meeting ends of the locking-clasp 12 are preferably tubulated and pass one into a slot in the other, so as to aline the tubulations thereof for the introduction of a split key $i$, which may have the lower ends of its two members spread apart where they project from the tubulations, and thus secure the two half-sections of the hood locked securely but detachably one to the other.

The pintle-bolt $c$ has its head $c'$ screwed upon the joined half-sections of the hood 11, the body of said bolt passing through mating notches formed in the meeting edges of said half-sections, as shown in Figs. 1 and 2, which connection will reinforce the junction of the hood-sections near their lower edges.

It will be seen that if the hood 11 is fitted upon the exterior of an animal's hoof, so that the tread-plate 8 will be drawn against the bottom thereof when the hood is in place, the application or removal of a shoe of the improved construction may be quickly effected and that the applied shoes will be reliable and durable and will avoid injury to the feet of an animal shod therewith.

When the shoes are so worn that their wear-plates need renewal, this may be done at small expense and the shoes be adapted for further service.

Having thus fully described my invention, I claim as new and desire to secure by Letters Patent—

1. In an adjustable horseshoe, the combination with a tread-plate and a hood thereon, both bisected at their front and the tread-sections hinged together, of a wear-plate comprising two side plates and a toe-plate, all secured upon the tread-plate.

2. In an adjustable horseshoe, the combination with a tread-plate comprising two half-sections having tongues and grooves formed at their front ends, and said tongues hinged together, and a two-part hood, the sections of which are held together at their front meeting edges by a locking-clasp, and at the lower edge by the head of the pintle-bolt for the hinge on the tread-plate, of a wear-plate formed in three portions, comprising two side plates of like form each having a heel-calk thereon, and each side plate detachably secured upon the tread-plate, and a toe-plate having an abutment-flange engaging with the inner edge of the tread-plate opposite the hinge-joint thereon, a toe-calk on the toe-plate, and means to detachably hold the toe-plate upon the tread-plate.

HARRIET R. FENLEY.

Witnesses:
C. C. LEWIS,
MOLLIE CAMPBELL.